United States Patent [19]

Olsen

[11] Patent Number: 4,781,275
[45] Date of Patent: Nov. 1, 1988

[54] COMPOSITION RAILWAY BRAKE SHOE

[75] Inventor: Alfred G. Olsen, Bloomingdale, Ill.

[73] Assignee: AMSTED Industries Incorporated, Chicago, Ill.

[21] Appl. No.: 605,152

[22] Filed: Apr. 30, 1984

[51] Int. Cl.[4] .............................................. F16D 69/02
[52] U.S. Cl. .............................. 188/251 A; 192/107 M
[58] Field of Search ............ 188/251 A, 251 R, 73.37, 188/264 G; 192/107 M

[56] References Cited

U.S. PATENT DOCUMENTS

| | | | |
|---|---|---|---|
| 1,784,994 | 12/1930 | Morris | 188/251 R |
| 3,751,330 | 8/1973 | Gilbert | 188/251 A X |
| 4,244,994 | 1/1981 | Trainor et al. | 192/107 M X |
| 4,320,823 | 3/1982 | Covaleski | 188/251 A X |
| 4,384,640 | 5/1983 | Trainor et al. | 192/107 M |

Primary Examiner—George E. A. Halvosa
Attorney, Agent, or Firm—Edward J. Brosius; Charles E. Bouton

[57] ABSTRACT

A composition railway brake shoe including a composition body having friction material dispersed therein and a binder formed essentially from rubber and a thermosetting phenolic resin attachable to a metallic back plate. A backing strip is interposed between the back plate and the body and comprises a rubber binder having dispersed therein a high strength and temperature resistant aramid fiber. The back strip and body are molded in the presence of heat to the back plate.

4 Claims, 1 Drawing Sheet

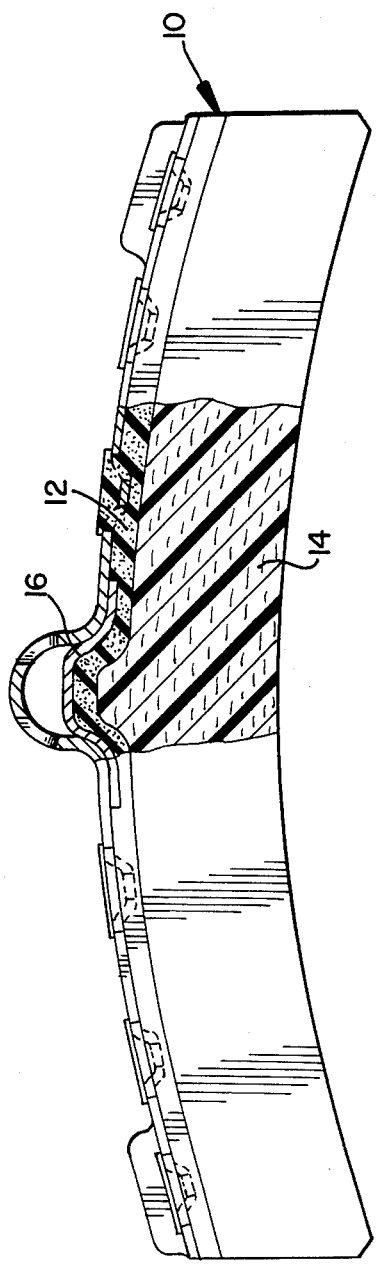

COMPOSITION RAILWAY BRAKE SHOE

FIELD OF THE INVENTION

The present invention relates to railway brakes and more particularly to railway brake shoes having a composition friction member.

BACKGROUND OF THE INVENTION

Composition brake shoes of the type to which the present invention relates generally comprise a metal back such as steel and a molded composition friction material bonded thereto. Generally a backing strip is interposed between the molded friction element to compensate primarily for the difference of thermal expansion between the metal plate and molded friction composition.

In the absence of such a strip the molded composition material has a tendency to fracture and/or separate from the steel backing plate.

The backing strip generally comprises a binder and fiber reinforcing material disbursed therein. Typically the binder has been essentially a rubber/resin mixture with fillers and fibers, such as asbestos, glass fibers, yarns, synthetic or natural.

More recently it has been common practice to utilize a ground rubber tire which includes synthetic and/or natural strands which has been used as the reinforcing material. The ground rubber tire contains oils which tends to reduce the adhesive characteristics of the backing strip thereby reducing the adherence to the steel back plate.

For a more detailed decription of the cord reinforced backing strip reference is made to U.S. Pat. No. 3,751,330.

SUMMARY OF THE PRESENT INVENTION

By the present invention it is proposed to provide backing strip which comprises essentially a curable rubber-resin binder, fillers and well dispersed reinforcing strands in more or less pulp form of an aramid fiber. The aramid fibers have a high tensile strength and temperature resistance of 400,000 psi and 420°-500° F. respectively. This makes it possible for the backing strip to perform its function as a reinforcing material when exposed to the high temperatures encountered in braking.

BRIEF DESCRIPTION OF THE DRAWINGS

FIG. 1 is a front elevational view of a composition brake shoe embodying the backing strip of the present invention.

DESCRIPTION OF THE PREFERRED EMBODIMENT

Referring now to the drawings there is shown a brake shoe 10 including a backing strip 12 embodying the composition of the present invention. The brake shoe 10 comprises generally a molded composition body 14 to which the backing strip 12 is adhered during the curing process more fully to be described hereinafter. The other face is adhered to the underside of a steel back plate 16. The back plate 16 may be constructed in accordance with structure shown and described in U.S. patent application Ser. No. 463,310 filed Feb. 2, 1983 and assigned to the assignee of the present invention.

The precise composition of the backing strip of the present invention may be widely varied but in all instances the strip must contain a rubber binder represented at least in part by a vulcanizable rubber or a mixture thereof containing dispersed strand particles or pulp of an aramid polymer.

The term aramid polymer as used herein means a synthetic polymeric resin generally designated in the art as an aromatic poly-carbonamide. Aramid polymer is disclosed in Technical Disclosure T950,008 (9500GL published Sept. 7, 1976 and based on an application originally filed Feb. 18, 1975) as being a polymer described in U.S. Pat. Nos. 3,652,510, 3,699,085 and 3,673,143. The aramid polymer covered is believed to be sold by E. I. Dupont de Nemours under the trade name KEVLAR. This product is characterized by recurring units of the formula

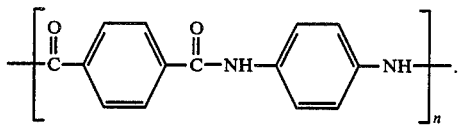

The KEVLAR has a tensile strength of about 400,000 psi and a heat resistance ranging about 420° to about 500° F.

The backing strip 12 of the present invention has the following representative compositional range in approximate percent by weight.

| Component | Approximate Percentage Range by Weight |
|---|---|
| 1. Curable rubber binder | 10 to 20 |
| 2. Filler | 60 to 85 |
| 3. Reinforcing Aramid Fiber | 0.3 to 1.0 |

The rubber binder used in the practice of the present invention includes such rubber materials as unvalcanized material and synthetic rubber or elastomeric materials that can be vulcanized or otherwise cured in site to form a matrix for the remaining materials of the backing strip. The rubbers are vulcanized with the aid of catalysts such as sulphur and the like. The vulcanizing catalysts and accelerators are present at concentrations in the range of about 0.4 to about 1.0 by weight based on the weight of the backing strip.

There also may be included in the rubber binder conventional rubber fillers such as clay, iron oxide and the like. These fillers are incorporated in the rubber binder at concentrations ranging from about 65 to about 85 percent by weight.

Thermosetting resins such as phenolaldehyde resins may also be incorporated in the rubber binder composition as a strengthening or stiffening agent for the rubber matrix. The phenolic resin may be a resin prepared from natural sources of phenol derivatives such as cashew nut shell oil. Typically the phenolic resins are incorporated in the rubber binder composition at concentrations in the range of about 1.0 to about 6.0 percent based on the weight of the backing sheet.

Curing agents such as hexamethylenetetramine and sulphur are included in relatively small amounts ranging from about 0.4 to about 1.0 percent of the weight of the backing strip and accelerators such as Benzothiazyl Disulfide (MBTS) and Tetramethylthiuam Disulfide (TMTD) may also be included.

As heretofore described the backing strip is reinforced by KEVLAR in pulp or short strand form. The KEVLAR is included in the back strip composition in the range of about 0.3 to about 1.0 percent by weight.

A typical composition of back strip is as follows:

EXAMPLE

| Component | Percent by Weight |
|---|---|
| Clay | 23.59 |
| Red Iron Oxide | 37.41 |
| Petroleum coke fines | 10.36 |
| Cured Rubber, ground | 6.89 |
| Uncured Rubber (Crumb form) | 16.52 |
| Hexamethylenetetramine | 0.08 |
| Sulphur | 0.36 |
| Phenolaldehyde | 3.84 |
| KEVLAR | 0.69 |
| Benzothiazyl Disulfide (MBTS) | 0.19 |
| Tetramethylthiuram Disulfide (TMTD) | 0.07 |
|  | 100.00 |

The rubber components and iron oxide were mixed in toluene for a period of time in a dispersion mixer. The remaining components were thereafter added and blended therewith. The resulting mixture was then dried to effect removal of the toluene and thereafter cold formed into strips approximately 3/16" thick.

The strips were thereafter disposed on steel back plate 16 and a cold formed friction composition 14 superimposed thereon. The steel back 16 may have a thermo responsive adhesive applied to the underside to adhere the back strip 12 thereto. The cold formed friction composition block includes a binder compatible with the binder composition in the backing strip so as to chemically bond therewith. The assembled steel back, backing strip and composition friction element are then placed in a mold and subjected to an elevated temperature sufficient to cure the friction composition element backing strip while bonding the latter to the friction composition element.

What is claimed is:

1. An improved composition railway brake shoe including a body of friction material including a binder having rubber and a thermosetting phenolic resin in which fillers and fibers are dispersed, a metal back plate for attaching said shoe to a railway car, and a backing strip interposed between said back plate and said body of friction material wherein the improvement comprises:

said backing strip comprising about 10–20 percent by weight of a curable rubber binder having dispersed therein a high strength and temperature resistant aramid fiber in pulp or short strand form ranging between about 0.3 to about 1.0 percent of the weight of said backing strip wherein said aramid fiber has tensile strength of 400,000 psi and temperature resistance between 420°–500° F.

2. The invention as defined in claim 1 wherein said aramid fiber comprises about 0.69% by weight of said backing strip.

3. The invention as defined in claim 2 wherein said aramid polymer fiber is characterized by recurring units of the formula

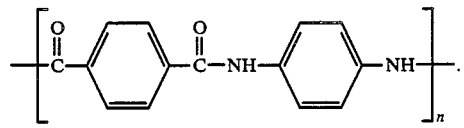

4. The invention as defined in claim 1 wherein the backing strip also includes about 1.0–6.0 percent by weight of a thermosetting resin.

* * * * *